United States Patent
Zheng et al.

(10) Patent No.: US 12,149,087 B1
(45) Date of Patent: Nov. 19, 2024

(54) POWER CONVERSION DEVICE AND MAXIMUM POWER POINT TRACKING CONTROL METHOD

(71) Applicant: FOXESS CO., LTD, Wenzhou (CN)

(72) Inventors: Chongfeng Zheng, Wenzhou (CN); Jian Peng, Wenzhou (CN)

(73) Assignee: Foxess Co., Ltd., Wenzhou (CN)

(*) Notice: Subject to any disclaimer, the term of this patent is extended or adjusted under 35 U.S.C. 154(b) by 0 days.

(21) Appl. No.: 18/657,729

(22) Filed: May 7, 2024

(30) Foreign Application Priority Data

Jun. 15, 2023 (CN) .......................... 202310705818.2

(51) Int. Cl.
- *H02J 3/38* (2006.01)
- *H02M 1/00* (2006.01)
- *H02M 3/00* (2006.01)
- *H02M 3/335* (2006.01)
- *H02M 7/537* (2006.01)

(52) U.S. Cl.
CPC .............. *H02J 3/38* (2013.01); *H02M 1/0009* (2021.05); *H02M 1/0067* (2021.05); *H02M 3/003* (2021.05); *H02M 3/335* (2013.01); *H02M 7/537* (2013.01); *H02J 2300/26* (2020.01)

(58) Field of Classification Search
CPC ...... H02J 3/38; H02J 2300/26; H02M 1/0009; H02M 1/0067; H02M 3/003; H02M 3/335; H02M 7/537
See application file for complete search history.

(56) References Cited

U.S. PATENT DOCUMENTS

| | | | | |
|---|---|---|---|---|
| 8,058,752 | B2* | 11/2011 | Erickson, Jr. | H02M 7/003 307/150 |
| 8,576,591 | B2* | 11/2013 | Phadke | H02J 1/10 363/124 |
| 9,219,363 | B2* | 12/2015 | Liu | H02J 1/102 |

(Continued)

FOREIGN PATENT DOCUMENTS

CN 113224798 A 8/2021

OTHER PUBLICATIONS

Haiyang, Ding, "Research on the Charging Control Strategy of Photovoltaic Power Generation System", China Academic Journal Electronic Publishing House, vol. 36, No. 12, 2006.

(Continued)

*Primary Examiner* — Daniel Kessie
*Assistant Examiner* — Brian K Baxter
(74) *Attorney, Agent, or Firm* — AP3 Law Firm PLLC (57) ABSTRACT

A power conversion device for a photovoltaic system includes a first boost isolation DC/DC converter and a controller. The first boost isolation DC/DC converter includes a transformer, an input terminal of the first boost isolation DC/DC converter is connected to a first photovoltaic component, and an output terminal of the first boost isolation DC/DC converter is connected to a DC bus. The controller is configured to receive a bus voltage of the DC bus and a bus output current output by the first boost isolation DC/DC converter, and output, based on the bus voltage and the bus output current output by the first boost isolation DC/DC converter, a switch control signal that controls the first boost isolation DC/DC converter to perform maximum power point tracking control of the first photovoltaic component.

20 Claims, 6 Drawing Sheets

(56) References Cited

U.S. PATENT DOCUMENTS

| | | | |
|---|---|---|---|
| 11,502,539 B2* | 11/2022 | Seki | H02J 3/32 |
| 2011/0115300 A1* | 5/2011 | Chiang | H01L 31/02021 |
| | | | 307/82 |
| 2012/0127764 A1* | 5/2012 | Phadke | H02J 3/381 |
| | | | 363/37 |
| 2013/0062958 A1* | 3/2013 | Erickson, Jr. | H02S 20/25 |
| | | | 307/82 |
| 2014/0077608 A1* | 3/2014 | Nosaka | H02J 1/102 |
| | | | 307/77 |
| 2014/0132073 A1* | 5/2014 | Satake | H02J 1/102 |
| | | | 307/64 |
| 2016/0126847 A1* | 5/2016 | Pahlevaninezhad | H02S 40/32 |
| | | | 363/21.02 |
| 2018/0287390 A1* | 10/2018 | Nakajima | H02J 7/35 |
| 2020/0366236 A1* | 11/2020 | Xu | H02J 3/32 |
| 2021/0098993 A1* | 4/2021 | Shi | H02M 1/00 |
| 2022/0294226 A1* | 9/2022 | Wang | H02J 1/10 |
| 2023/0063555 A1* | 3/2023 | Tamao | H02J 1/12 |
| 2023/0170844 A1* | 6/2023 | Xu | G05F 1/67 |
| | | | 136/244 |
| 2024/0154454 A1* | 5/2024 | Choi | H02J 7/35 |
| 2024/0235365 A1* | 7/2024 | Lee | H02J 7/005 |

OTHER PUBLICATIONS

Jianming, Huang, et al., "Design and Implementation of DC Modular Photovoltaic Grid-Connected Control System", Advanced Technology of Electrical Engineering and Energy, vol. 33, No. 44, Apr. 2014.

Jian, Wang, et al., "Control Strategy for Single Phase Grid-Connected Photovoltaic Converter with Wide Input Voltage Range", Journal of Beijing Jiaotong University, vol. 35, No. 5, Oct. 2011.

* cited by examiner

POWER CONVERSION DEVICE AND MAXIMUM POWER POINT TRACKING CONTROL METHOD

CROSS-REFERENCE TO RELATED APPLICATIONS

This application claims priority to Chinese Patent Application No. 202310705818.2, filed on Jun. 15, 2023, and entitled "POWER CONVERSION DEVICE AND MAXIMUM POWER POINT TRACKING CONTROL METHOD," which is hereby incorporated by reference herein as if reproduced in its entirety.

TECHNICAL FIELD

The present disclosure relates to the field of photovoltaic power generation, and in particular, to a power conversion device and a maximum power point tracking control method.

BACKGROUND

As the shortage of conventional energy becomes increasingly serious, photovoltaic power generation, as an energy-saving and environment-friendly green power generation method, is gradually being promoted and used both at home and abroad.

Photovoltaic components (also commonly known as solar photovoltaic panels) convert the received light into electrical energy in the form of direct current, and then converters convert the direct current into another direct current to power a DC load, or convert the direct current into an alternating current for grid-connection or to supply power an AC load.

As we all know, an output power of photovoltaic components is affected by light. In order to obtain a maximum power output, the maximum power tracking of photovoltaic components has become a core technology of photovoltaic power generation. With the development of technology and product iteration, it has become an indispensable and mature technology in photovoltaic power generation products such as photovoltaic single-phase inverter, optimizer, photovoltaic control box, etc.

Figure 1:
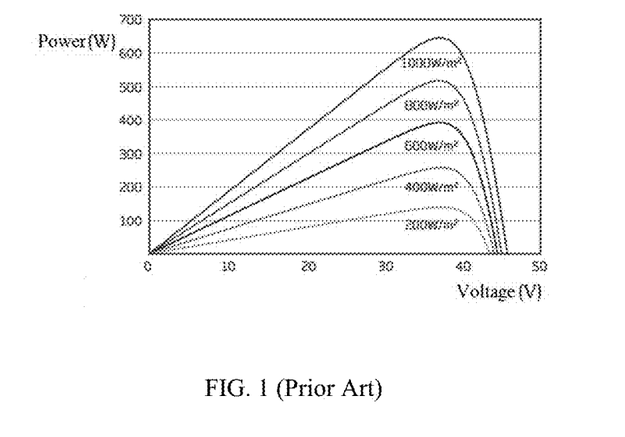
FIG. 1 is a schematic diagram of a PV curve of a conventional photovoltaic component.

Refer to the schematic diagram of the PV curve of the conventional photovoltaic component as shown in FIG. 1. It can be seen that there is only one maximum power point of the photovoltaic component, which is related to the voltage of the photovoltaic component. In the existing technology, the purpose of tracking the maximum power point of the photovoltaic component is usually achieved by sampling the voltage and current of the photovoltaic component (PV), calculating the power of the photovoltaic component, and perturbing the voltage of the photovoltaic component.

For traditional string single-phase inverters, photovoltaic components are connected in series to obtain high voltage and then the high voltage is transfer to a single-phase inverter. The rear-stage single-phase inverter widely uses boost circuits as the front stage, and then inverts the high-voltage DC into an alternating current for grid-connection. Since both the boost circuit and the inverter circuit are non-isolation converters, and a controller and the boost circuit share the same ground, the voltage and current of the photovoltaic components string can be obtained by directly use a low-cost resistor plus operational amplifier sampling method, to realize the maximum power point tracking of photovoltaic components.

As countries pay more attention to the safety of photovoltaic power generation, optimizers and micro single-phase inverters have quickly entered everyone's field of vision. Especially, micro single-phase inverters become more and more popular among people since they can achieve low-voltage isolation and component-level maximum power tracking and monitoring.

Since the output voltage of a single photovoltaic component is low, the traditional solution of front-stage boost plus rear-stage inverter has more obvious shortcomings such as low conversion efficiency because of high boost voltage ratio. Therefore, for micro single-phase inverters connected to a single photovoltaic component, high-frequency isolation solutions such as flyback, LLC, push-pull and other circuits are chosen mostly as the front stage. The high frequency transformer takes advantage of its own turns ratio to achieve high voltage boost. This high-frequency isolation solution isolates photovoltaic components and inverters. Refer to the schematic diagram of a typical micro single-phase inverter shown in FIG. 2. The photovoltaic component 210 and the inverter 220 are isolated by the high frequency transformer 231 in the high frequency isolation converter 230.

Since the photovoltaic component 210 and the inverter 220 are in an isolation relationship, there are two solutions of using one DSP and using two DSPs for control.

Figure 3:
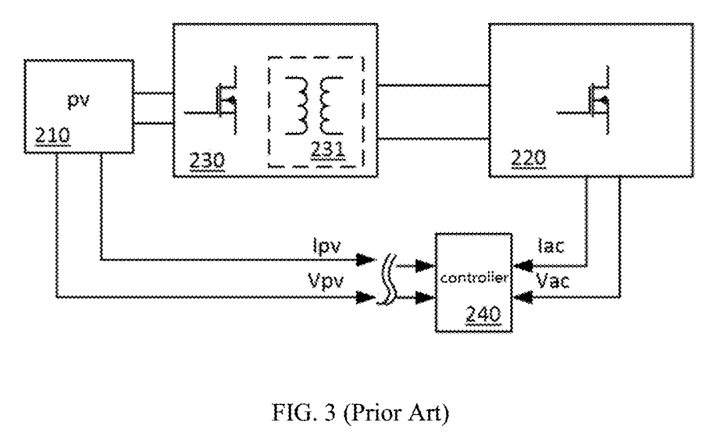
FIG. 3 is a schematic diagram of a typical micro single-phase inverter.

The solution of using one DSP is: to place the controller 240 on the low-voltage side of the photovoltaic component 210, use a resistor plus an operational amplifier to sample the voltage Vpv and current Ipv of the photovoltaic component 210, and use an isolation sampling method to sample the AC voltage Vac and AC current Iac; or to place the controller 240 on the high-voltage inverter 220 side, use a resistor plus an operational amplifier to sample the AC voltage Vac and AC current Iac, and use an isolation sampling method to sample the voltage Vpv and current Ipv of the photovoltaic component 210, and drive a switch on the low-voltage side of the photovoltaic component 210 in the high-frequency isolation converter 230 by means of isolation driving. Please refer to the schematic diagram of a typical micro single-phase inverter as shown in FIG. 3.

Here, the voltage Vpv and current Ipv of the photovoltaic component 210 are used for maximum power algorithm control, and the AC voltage Vac and AC current Iac in the inverter are used for the control of the inverter 220. It can be seen that whether the controller 240 is placed on the side of the photovoltaic component 210 or on the AC side where the inverter 220 is located, isolation sampling must be used to obtain the voltage and current on the side where the controller is not located.

Current isolation sampling includes optical isolation sampling, capacitive isolation sampling and magnetic isolation sampling. Compared with non-isolation sampling (or direct sampling) which uses resistors and operational amplifiers, the cost is high and the volume is large, and isolation sampling will introduce sampling delay, causing inconvenience to control.

The solution of using two DSPs is: one controller (DSP1) is placed on the side of the photovoltaic component, and another controller (DSP2) is placed on the AC side where the inverter is located, to directly sample the electrical signals required for the maximum power tracking, as well as the electrical signals required for inverter control. Then optocoupler isolation communication is used to communicate information between DSP1 and DSP2. Although this solution avoids the use of isolation sampling, it requires two DSPs, which increases the cost a lot and increases the number of peripheral circuits.

In addition, the power level of photovoltaic components is usually several hundred watts, e.g., the commonly used 600 W. The voltage Vpv of the photovoltaic component is usually tens of volts, such as more than 20 volts or more than 30 volts, and the current Ipv of the photovoltaic component is usually tens of amps, such as between 20 amps and 30 amps. In order to achieve maximum power tracking, when sampling the current Ipv of the photovoltaic component, for the non-isolation sampling method using a resistor plus an operational amplifier, if accurate sampling is required, a sampling resistor with a larger resistance needs to be used, which will lead to large sampling loss; if a sampling resistor with a smaller resistance value is required to reduce the loss, the sampling accuracy will be insufficient. Therefore, in the prior art, there exists the disadvantage that the accuracy and the loss cannot be balanced in the current Ipv sampling of the photovoltaic component, which makes the design difficult.

SUMMARY

The application provides a power conversion device for a photovoltaic system, comprising: a first boost isolation DC/DC converter including a transformer, wherein an input terminal of the first boost isolation DC/DC converter is connected to a first photovoltaic component, and an output terminal of the first boost isolation DC/DC converter is connected to a DC bus; and a controller configured to receive a bus voltage of the DC bus and a bus output current output by the first boost isolation DC/DC converter, and output, based on the bus voltage and the bus output current output by the first boost isolation DC/DC converter, a switch control signal that controls the first boost isolation DC/DC converter to perform maximum power point tracking control of the first photovoltaic component.

Further, the controller and a secondary winding of the transformer have a common ground.

Further, the controller is further configured to control, by use of the switch control signal, to maximize the bus output current output by the first boost isolation DC/DC converter.

Further, the controller comprising: a first multiplication module multiplying the bus voltage and the bus output current of the first boost isolation DC/DC converter to obtain a current output power of the first boost isolation DC/DC converter; a maximum power point tracking control module obtaining a rated current variation coefficient of the first boost isolation DC/DC converter based on a difference between the current output power of the first boost isolation DC/DC converter and an output power of the first boost isolation DC/DC converter at a previous moment; a second multiplication module multiplying the rated current variation coefficient of the first boost isolation DC/DC converter and a rated current of the first boost isolation DC/DC converter to obtain a bus output current reference value of the first boost isolation DC/DC converter; a first subtraction module performing a subtraction operation on the bus output current reference value of the first boost isolation DC/DC converter and the bus output current of the first boost isolation DC/DC converter to obtain a bus output current difference of the first boost isolation DC/DC converter; and a first operation unit outputting the switch control signal for controlling the first boost isolation DC/DC converter based on the bus output current difference of the first boost isolation DC/DC converter.

Further, the device comprises an inverter, wherein a DC terminal of the inverter is connected to the DC bus, and an AC terminal of the inverter is used to output an alternating current.

Further, the controller is further configured to receive an alternating current and an alternating voltage output by the inverter, and output the switch control signal for controlling operation of the inverter based on the bus voltage, the alternating current, and the alternating voltage.

Further, the controller further comprises: a second subtraction module performing a subtraction operation on a bus voltage reference value and the bus voltage to obtain a bus voltage difference; a second operation unit obtains an alternating current variation coefficient based on the bus voltage difference; a phase-locked control module outputting a phase-locked sine wave based on the alternating voltage; a third multiplication module multiplying the phase-locked sine wave, the alternating current variation coefficient and a peak value of the alternating current to obtain an alternating current reference value; a third subtraction module performing a subtraction operation on the alternating current reference value and the alternating current to obtain an alternating current difference; and a third operation module outputting the switch control signal for controlling the inverter based on the alternating current difference.

Further, the device further comprises a second boost isolation DC/DC converter including a transformer, wherein an input terminal of the second boost isolation DC/DC converter is connected to a second photovoltaic component, and an output terminal of the second boost isolation DC/DC converter is connected to the DC bus; and wherein the controller is further configured to receive a bus output current output by the second boost isolation DC/DC converter, and output, based on the bus voltage and the bus output current output by the second boost isolation DC/DC converter, a second switch control signal that controls the second boost isolation DC/DC converter to perform maximum power point tracking control of the second photovoltaic component.

Further, the controller is further configured to control, by use of the second switch control signal, to maximize the bus output current output by the second boost isolation DC/DC converter.

Further, the first photovoltaic component comprises one photovoltaic cell group or multiple photovoltaic cell groups connected in series and parallel.

The application further provides a maximum power point tracking control method for a photovoltaic component, comprising: detecting, with a voltage detection circuit of a power conversion device, a bus voltage of a DC bus connected to an output terminal of a first boost isolation DC/DC converter; detecting, with a current detection circuit of a power conversion device, a bus output current at the output terminal of the first boost isolation DC/DC converter; and performing, and with a controller of the power conversion device, maximum power point tracking control of a first photovoltaic component based on the bus voltage and the bus output current of the first boost isolation DC/DC converter, wherein an input terminal of the first boost isolation DC/DC converter is connected to the first photovoltaic component.

Further, the maximum power point tracking control method further comprises: controlling, with the controller, the bus output current of the first boost isolation DC/DC converter based on the bus voltage and the bus output current of the first boost isolation DC/DC converter, to achieve the maximum power point tracking control of the first photovoltaic component.

Further, the maximum power point tracking control method further comprises: multiplying, with the controller, the bus voltage and the bus output current of the first boost isolation DC/DC converter to obtain a current output power of the first boost isolation DC/DC converter; obtaining, with the controller, a rated current variation coefficient of the first boost isolation DC/DC converter based on a difference between the current output power of the first boost isolation DC/DC converter and an output power at a previous moment; multiplying, with the controller, the rated current variation coefficient of the first boost isolation DC/DC converter and a rated current of the first boost isolation DC/DC converter to obtain a bus output current reference value of the first boost isolation DC/DC converter; performing, with the controller, a subtraction operation on the bus output current reference value of the first boost isolation DC/DC converter and the bus output current of the first boost isolation DC/DC converter to obtain a bus output current difference of the first boost isolation DC/DC converter; and outputting, with the controller based on the bus output current difference of the first boost isolation DC/DC converter, the switch control signal for controlling the first boost isolation DC/DC converter, to track a maximum power point of the first photovoltaic component.

Further, the maximum power point tracking control method further comprising: detecting, with an alternating voltage detection circuit of the power conversion device, an alternating voltage at an AC output side of an inverter; detecting, with an alternating current detection circuit of the power conversion device, an alternating current at the AC output side of the inverter, wherein a DC terminal of the inverter is connected to the DC bus; and outputting, with the controller, a switch control signal for controlling operation of the inverter based on the bus voltage, the alternating current, and the alternating voltage.

Further, the maximum power point tracking control method further comprises: performing, with the controller, a subtraction operation on a bus voltage reference value and the bus voltage to obtain a bus voltage difference; obtaining, with the controller, an alternating current variation coefficient based on the bus voltage difference; outputting, with the controller, a phase-locked sine wave based on the alternating voltage; multiplying, with the controller, the phase-locked sine wave, the alternating current variation coefficient and a peak value of the alternating current to obtain an alternating current reference value; performing, with the controller, a subtraction operation on the alternating current reference value and the alternating current to obtain an alternating current difference; and outputting, with the controller, the switch control signal for controlling the inverter based on the alternating current difference.

Further, the maximum power point tracking control method further comprises: detecting, with a second current detection circuit of the power conversion device, a bus output current of a second boost isolation DC/DC converter; and performing, with the controller, maximum power point tracking control of a second photovoltaic component based on the bus voltage and the bus output current of the second boost isolation DC/DC converter, wherein an input terminal of the second boost isolation DC/DC converter is connected to the second photovoltaic component.

Further, the maximum power point tracking control method further comprises: controlling, with the controller, to maximize the bus output current of the second boost isolation DC/DC converter based on the bus voltage and the bus output current of the second boost isolation DC/DC converter, to achieve the maximum power point tracking control of the second photovoltaic component.

BRIEF DESCRIPTION OF THE DRAWINGS

For a more complete understanding of the present disclosure, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

The following describes the technical solutions in the present disclosure with reference to the accompanying drawings clearly and completely. Apparently, the described embodiments are merely a part rather than all of the embodiments of the present disclosure. All other embodiments obtained by those of ordinary skill in the art based on the embodiments of the present disclosure without creative efforts shall fall within the scope of protection of the present disclosure.

Figure 4:
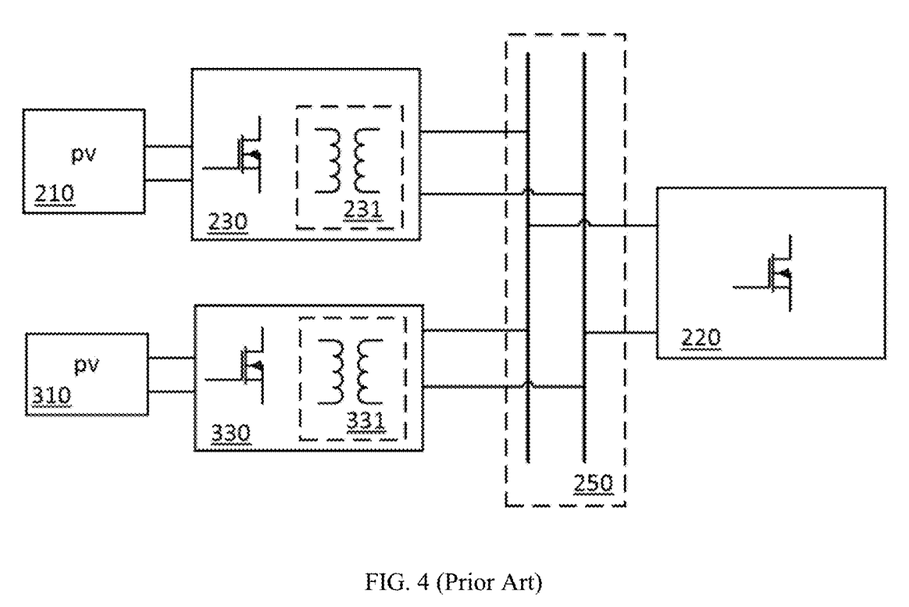
FIG. 4 is a schematic diagram of a typical power conversion device.

Please refer to a schematic diagram of a typical power conversion device as shown in FIG. 4. The power conversion device is applied in a photovoltaic inverter system. As shown in FIG. 4, the power conversion device at least includes a first boost isolation DC/DC converter 230 and an inverter 220. The first boost isolation DC/DC converter 230 includes a transformer 231. The input terminal of the first boost isolation DC/DC converter 230 is connected to a first photovoltaic component 210, and the output terminal of the first boost isolation DC/DC converter 230 is connected to a DC bus 250. The first photovoltaic component 210 is used to convert light energy into electrical energy, and the first boost isolation DC/DC converter 230 is used to boost the electrical energy generated by the first photovoltaic component 210 into direct current output to the DC bus 250. The transformer 231 in the first boost isolation DC/DC converter 230 implements the isolation of the first photovoltaic component 210 from the DC bus 250. The DC terminal of the inverter 220 is connected to the DC bus 250 to invert the DC power on the DC bus 250 into AC power for grid-connection or power supply for AC loads. In this way, photovoltaic power generation is realized.

Please continue to refer to FIG. 4. The power conversion system can further include a second boost isolation DC/DC converter 330. The second boost isolation DC/DC converter 330 includes a transformer 331. The input terminal of the second boost isolation DC/DC converter 330 is connected to the second photovoltaic components 310, and the output terminal of the second boost isolation DC/DC converter 330 is connected to the DC bus 250. Similarly, the second photovoltaic component 310 is used to convert light energy into electrical energy, and the second boost isolation DC/DC converter 330 is used to boost the electrical energy generated by the second photovoltaic component 310 into the direct current that is output to the DC bus 250. The transformer 331 in the second boost isolation DC/DC converter 330 realizes the isolation between the second photovoltaic component 310 and the DC bus 250.

As such, the multi-channel boost isolation DC/DC converter is used as the front-stage circuit, and the inverter 220 is used as the rear-stage inverter circuit, which can improve the power level and efficiency of the power conversion device. Compared with the traditional front-stage boost circuit, the boost isolation DC/DC converter utilizes the turn ratio of the high-frequency transformer to achieve high boost. FIG. 4 is a typical power conversion device used in photovoltaic inverter systems. The number of boost isolation DC/DC converters in the front stage can be designed as needed to meet the requirements of different power levels.

For the power conversion device shown in FIG. 4, as described in the prior art, in order to follow the maximum power point of the photovoltaic component and control the inverter, it needs to simultaneously sample the voltage Vpv and current Ipv of the photovoltaic component and sample the AC voltage Vac and AC current Iac of the inverter. Therefore, whether the controller is placed on the side of the photovoltaic component or the AC side where the inverter is located, isolation sampling must be used to obtain the voltage and current on the side where the controller is not located. As a result, photovoltaic maximum power point tracking control has the problems of high cost, large volume, signal delay or large loss.

For the boost isolation DC/DC converter, in the input side the electrical energy output from the photovoltaic component is received, that is, it has input power Pin=Vpv*Ipv, where Vpv is the voltage of the photovoltaic component and Ipv is the current of the photovoltaic component. In the output side the bus voltage Vbus and the bus output current Ibus are output, that is, it has output power Pout=Vbus*Ibus. Due to the power loss of the boost isolation DC/DC converter, usually Pout=k*Pin, where k is greater than 0 and less than 1.

Figure 2:
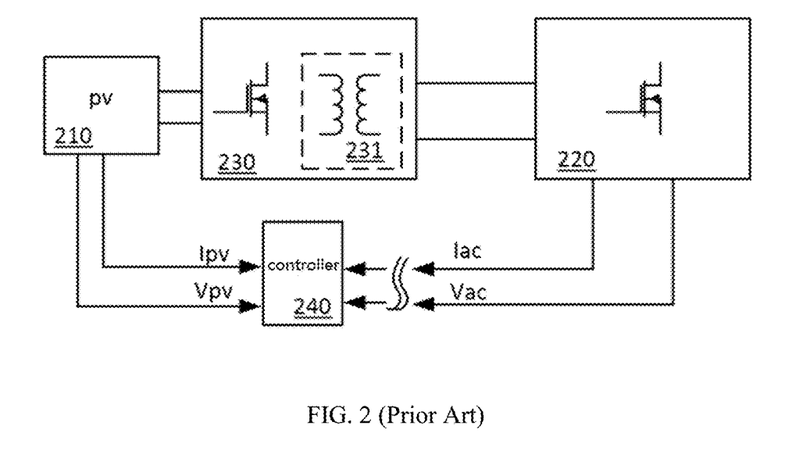
FIG. 2 is a schematic diagram of a typical micro single-phase inverter.

In the existing technology, the power of the photovoltaic component is usually calculated by sampling the voltage and current of the photovoltaic component (PV), and the voltage of the photovoltaic component is disturbed, thus achieving the purpose of tracking the maximum power point of the photovoltaic component, see FIG. 2 and FIG. 3, that is, maximizing the input power Pin of the boost isolation DC/DC converter. There are many problems mentioned in the prior art.

However, the inventor found that according to the relationship between the input power Pin and the output power Pout of the boost isolation DC/DC converter (Pout=k*Pin), if the output power Pout can be maximized, then the input power Pin can also be maximized.

Figure 5:
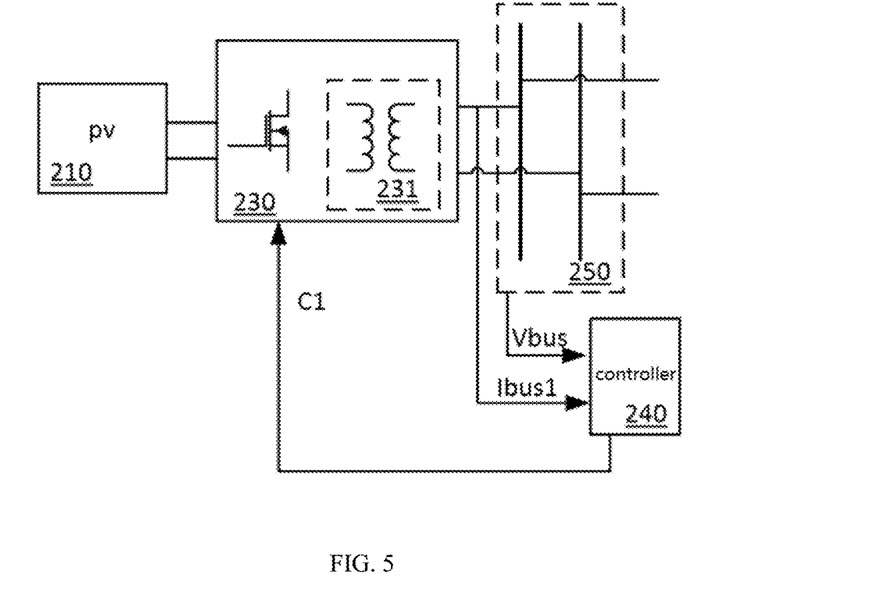
FIG. 5 is a schematic diagram of a power conversion device according to one embodiment of the present application.

Based on the concept that when maximizing the output power Pout of the boost isolation DC/DC converter, the input power Pin can be maximized, in one embodiment of the present disclosure, a power conversion device is provided, which can be applied to a photovoltaic power generation system. Specifically, refer to a schematic diagram of a power conversion device of an embodiment of the present disclosure as shown in FIG. 5, the power conversion device comprises a first boost isolation DC/DC converter 230, including a transformer 231, the input terminal of the first boost isolation DC/DC converter 230 connected to a first photovoltaic component 210, and the output terminal of the first boost isolation DC/DC converter 230 connected to a DC bus 250;

a controller 240 which receives the bus voltage Vbus of the DC bus 250 and the bus output current Ibus1 output by the first boost isolation DC/DC converter 230, and outputs a switch control signal C1 that controls the operation of the first boost isolation DC/DC converter 230 according to the bus voltage Vbus and the bus output current Ibus1 of the first boost isolation DC/DC converter 230, to perform maximum power point tracking control of the first photovoltaic component 210.

As mentioned above, the maximum power point of the photovoltaic component can be tracked from by sampling the voltage and output current of the photovoltaic component (PV), to by sampling the bus voltage and bus output current of the output side of the isolation DC/DC converter. That is, the sampling circuit required for tracking the maximum power point of the photovoltaic component is moved from the primary side of the transformer to the secondary side of the transformer. At present, the bus voltage Vbus of the DC bus is usually 400V, and there is a tendency to transition to 600V. For a photovoltaic component with a bus voltage Vbus of 400V and a power level of 600 W, the bus output current Ibus1 output by the first boost isolation DC/DC converter 230 is only 1.5 A, which is greatly decreased compared to the tens of amps of current Ipv of the photovoltaic component. Therefore, a sampling resistor with a larger resistance value can be used to improve the sampling accuracy, and the loss is not large. Therefore, the power conversion device provided by the present application can have the advantages of high accuracy of current sampling and low loss, and the design difficulty is greatly reduced. Moreover, the sampling delay by using the sampling resistor in a non-isolation sampling mode is also small, and the real-time performance of the control is better.

In a specific application, the current sampling circuit used to sample the bus output current Ibus1 output by a boost isolation DC/DC converter 230 is usually a sampling circuit with a resistor adding an operational amplifier. It not only has the advantages of small size and low cost of the non-isolation sampling circuit, but also has the above-mentioned advantages of high accuracy of current sampling and low loss.

Further, as shown in FIG. 5, the first boost isolation DC/DC converter 230 includes a switch, and the switch control signal C1 is used to control the switch in the first boost isolation DC/DC converter 230 to achieve the maximum power point tracking control of the first photovoltaic component 210.

Furthermore, the first boost isolation DC/DC converter 230 can be any converter with both boost and isolation functions, such as flyback, LLC, push-pull and other circuits. The specific structure of the boost isolation DC/DC converter 230 is not limited in the application.

Generally, the first boost isolation DC/DC converter 230 includes a primary switch unit, a transformer and a secondary switch unit. The primary switch unit is connected between the first photovoltaic component 210 and the primary winding of the transformer 230. The secondary switch unit is connected between the secondary winding of the transformer 230 and the DC bus 250. The above-mentioned switch control signal C1 is usually used to control the switches in the primary switch unit to achieve maximum power point tracking control of the first photovoltaic component 210.

In practical applications, the controller 240 shares the ground with the secondary winding of the transformer 231. So, it can be realized that the sampling circuit for tracking the maximum power point of the photovoltaic component is placed on the secondary side of the transformer.

Figure 6:
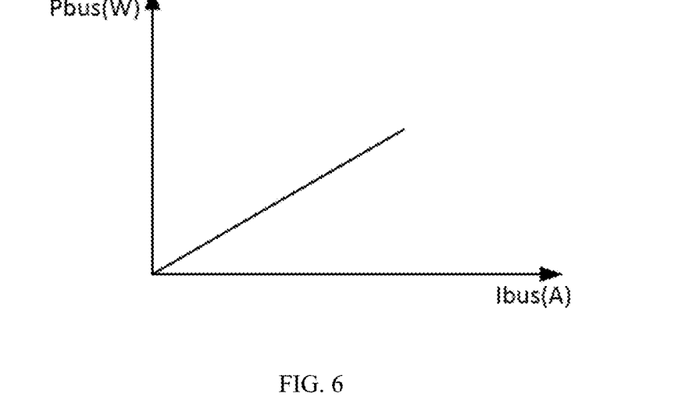
FIG. 6 is a schematic diagram of a curve showing a relationship of an output power of a boost isolation DC/DC converter and a bus output current.

Please refer to the schematic diagram of the curve between the output power of the boost isolation DC/DC converter and the bus output current as shown in FIG. 6. The output power of the boost isolation DC/DC converter is Pout=Vbus*Ibus, wherein the bus voltage Vbus is a substantially constant voltage value. The output power Pout of the boost isolation DC/DC converter increases as the increase of the bus output current Ibus of the boost isolation DC/DC converter, which is basically a linear relationship. Therefore, as long as the boost isolation DC/DC converter is controlled to maximize the bus output current Ibus of the boost isolation DC/DC converter, the output power Pout of the boost isolation DC/DC converter can be maximized, thereby realizing the maximum power point tracking of the first photovoltaic component 210.

That is, the switch control signal C1 of the first boost isolation DC/DC converter 230 controls to maximize the bus output current Ibus1 output by the first boost isolation DC/DC converter 230. The "maximize" here refers to making the controlled object approach the maximum value it can achieve.

Figure 7:
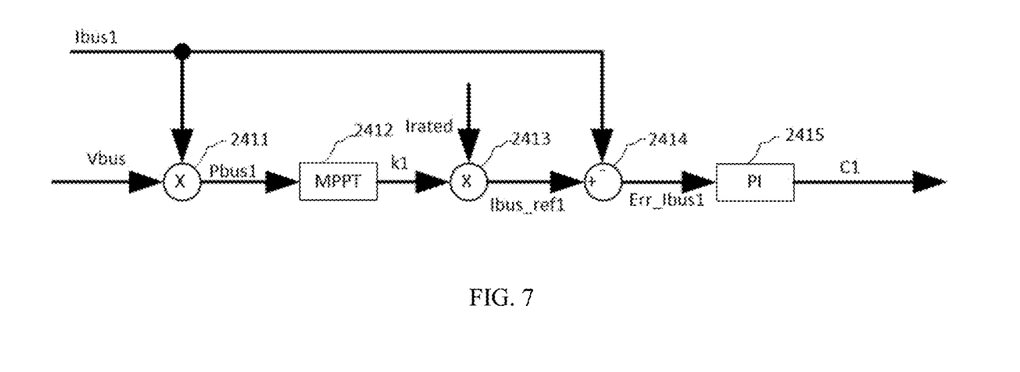
FIG. 7 is a schematic diagram of a controller applied in the power conversion device shown in FIG. 5 according to one embodiment of the present application.

Specifically, refer to as shown in FIG. 7 the schematic diagram of a controller applied in the power conversion device as shown in FIG. 5 of one embodiment of the present application. The controller 240 includes:
- a first multiplication module 2411 multiplying the bus voltage Vbus and the bus output current Ibus1 of the first boost isolation DC/DC converter 230 to obtain the current output power Pbus1 of the first boost isolation DC/DC converter 230;
- a maximum power point tracking control module (MPPT) 2412 obtaining a rated current variation coefficient k1 of the first boost isolation DC/DC converter 230 based on the difference between the current output power Pbus1 of the first boost isolation DC/DC converter 230 and the output power at the previous moment;
- a second multiplication module 2413 multiplying the rated current variation coefficient k1 of the first boost isolation DC/DC converter 230 and the rated current Irated of the first boost isolation DC/DC converter 230 to obtain a bus output current reference value Ibus_ref1 of the boost isolation DC/DC converter 230;
- a first subtraction module 2414 subtracting the bus output current Ibus1 of the first boost isolation DC/DC converter 230 from the bus output current reference value Ibus_ref1 of the first boost isolation DC/DC converter 230 to obtain a bus output current difference Err_Ibus1 of the boost isolation DC/DC converter 230; and
- a first operation module 2415 outputting a switch control signal C1 for controlling the first boost isolation DC/DC converter 230 according to the bus output current difference Err_Ibus1 of the first boost isolation DC/DC converter 230.

In one embodiment, the first multiplication module 2411 includes a first multiplier. In one embodiment, the maximum power point tracking control module (MPPT) 2412 includes a maximum power point tracking controller. In one embodiment, the second multiplication module 2413 includes a second multiplier. In one embodiment, the first subtraction module 2414 includes a first subtractor. In one embodiment, the first operation module 2415 includes an output node which is the first output node of the controller 240.

Specifically, in one embodiment, the first operation module 2415 is a PI module. However, the present application does not limit the specific type of the first operation module 2415, as long as it can output the required switch control signal according to the bus output current difference Err_Ibus1.

Specifically, in practical applications, the controller 240 is a DSP or other microcontrollers. Therefore, the first multiplication module 2411, the maximum power point tracking control module (MPPT) 2412, the second multiplication module 2413, the first subtraction module 2414 and the first operation module 2415 above-mentioned are implemented by programming.

Specifically, according to the principle of the controller shown in FIG. 7, it can be seen that the loop used for maximum power point tracking control is the current loop controlling the bus output current Ibus. By calculating the output power of the first boost isolation DC/DC converter 230, and disturbing the bus output current Ibus1 of the first boost isolation DC/DC converter 230, the bus output current Ibus1 of the first boost isolation DC/DC converter 230 is maximized to track the maximum output power of the first boost isolation DC/DC converter 230, so as to achieve the purpose of tracking the maximum power point of photovoltaic components.

Usually, the controller that realizes tracking the maximum power point of the photovoltaic component is also used for the control of the rear-stage inverter, and thus the signal sampling required for tracking the maximum power point of the photovoltaic component and the sampling for the control of the inverter are all located on the secondary side of the transformer with no need of isolated sampling. Compared with the prior art, it has the advantages of low cost of photovoltaic maximum power point tracking control, small size and no signal delay.

Figure 8:
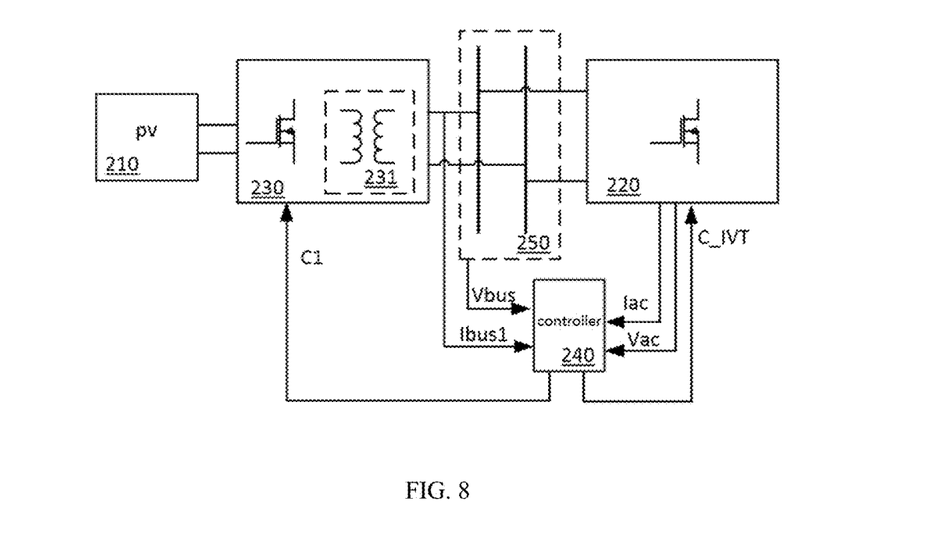
FIG. 8 is a schematic diagram of a power conversion device according to another embodiment of the present application.

FIG. 8 is a schematic diagram of a power conversion device according to another embodiment of the present application. The power conversion device further includes an inverter 220. The DC terminal of the inverter 220 is connected to the DC bus 250, and the AC terminal of the inverter 220 is used to output AC power. That is, the inverter 220 is used to invert the direct current at the direct current bus into alternating current, so as to supply power for the alternating current load or connect to the grid. The power conversion device shown in FIG. 8 is implemented as a photovoltaic inverter system.

Specifically, as shown in FIG. 8, the controller 240 also receives the alternating current Iac and the alternating voltage Vac output by the inverter 220, and outputs the switch control signal C_IVT for controlling the operation of the inverter 220 according to the bus voltage Vbus, the alternating current Iac and the alternating voltage Vac, in order to convert direct current into alternating current and stabilize the bus voltage Vbus. Because the bus voltage Vbus is stabilized by the rear-stage inverter, maximum output power of the first boost isolation DC/DC converter 230 is realized by maximizing the bus output current Ibus1 of the first boost isolation DC/DC converter 230, so as to achieve the purpose of tracking the maximum power point of the photovoltaic component.

Figure 9:
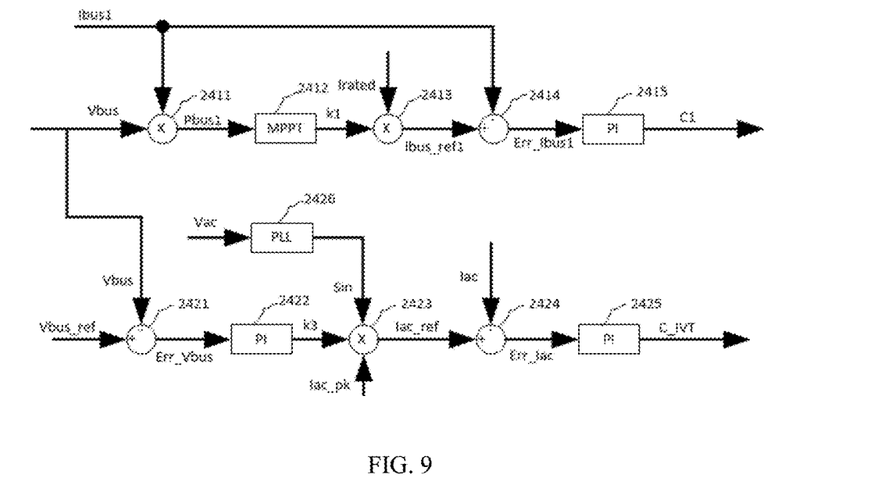
FIG. 9 is a schematic diagram of a controller applied in the power conversion device shown in FIG. 8 according to one embodiment of the present application.

FIG. 9 is a schematic diagram of a controller applied in the power conversion device shown in FIG. 8 of one embodiment of the present application. As shown in FIG. 9, the controller 240 on the basis of FIG. 7 further includes:

- a second subtraction module 2421 subtracting the bus voltage Vbus from the bus voltage reference value Vbus_ref to obtain a bus voltage difference Err_Vbus;
- a second operation module 2422 obtaining an AC current variation coefficient k3 according to the bus voltage difference Err_Vbus;
- a phase-locking control module 2426 outputting the phase-locked sine wave Sin according to the AC voltage Vac;
- a third multiplication module 2423 performing multiplication operation on the phase-locked sine wave Sin, the alternating current variation coefficient k3 and the alternating current peak value Iac_pk to obtain an alternating current reference value Iac_ref;
- a third subtraction module 2424 performing subtraction operation on the alternating current reference value Iac_ref and the alternating current Iac to obtain an alternating current difference Err_Iac; and
- a third operation module 2425 outputting the switch control signal C_IVT for controlling the inverter 220 according to the alternating current difference Err_Iac.

In one embodiment, the second subtraction module 2421 includes a second subtractor. In one embodiment, the second operation module 2422 includes a regulator. In one embodiment, the phase-locking control module 2426 includes a phase-locked controller. In one embodiment, the third multiplication module 2423 includes a third multiplier. In one embodiment, the third subtraction module 2424 includes a third subtractor. In one embodiment, the third operation module 2425 includes an output node which is the second output node of the controller 240.

Specifically, in one embodiment, the second operation module 2422 and the third operation module 2425 are PI modules. However, this application does not limit the specific types of the second operation module 2422 and the third operation module 2425, as long as the second operation module 2422 can obtain the alternating current variation coefficient k3 according to the bus voltage difference Err_Vbus, and the third operation module 242 can output the switch control signal C_IVT for controlling the inverter 220 according to the alternating current difference value Err_Iac.

The second subtraction module 2421, the second operation module 2422, phase-locked control module 2426, the third multiplication module 2423, the third subtraction module 2424 and the third operation module 2425 above-mentioned are implemented by programming in the controller 240.

As shown in FIG. 9, the control of the inverter in the rear-stage includes two loops: one is the voltage loop of the bus voltage Vbus, and the output of the loop is the alternating current variation coefficient k3. The alternating current variation coefficient k3 is multiplied by the phase-locked sine wave Sin, and then multiplied by the alternating current peak value Iac_pk to obtain the alternating current reference value Iac_ref. Then the difference between the sampled alternating current Iac and the alternating current reference value Iac_ref is used to PI operation to obtain the switch control signal C_IVT for controlling the rear-stage inverter. For two loops of the rear-stage inverter, one is used to stabilize the bus voltage Vbus and the other to output sinusoidal current.

Here, the bus voltage reference value Vbus_ref and the alternating current peak value Iac_pk have been determined when the design of the power conversion device is completed, so the bus voltage reference value Vbus_ref and the alternating current peak value Iac_pk are given values.

Here, the bus voltage Vbus, the bus output current Ibus1, the alternating current Iac, and the alternating voltage Vac of the first boost isolation DC/DC converter 230 are obtained by sampling. As shown in FIG. 8, the controller 240 and the secondary winding of the transformer in the first boost isolation DC/DC converter 230 share the same ground, that is, the controller 240 is placed on the side of the inverter. The bus voltage Vbus, the bus output current Ibus1, the alternating current Iac and the alternating voltage Vac of the first boost isolation DC/DC converter 230 (these four sampling signals) are also on the side of the inverter. Compared with the prior art solution which uses one controller, this application eliminates the need for isolated sampling, reduces costs and size, and does not lead to sampling delays, bringing convenience to control. Compared with the prior art solution which uses two controllers, this application can reduce one controller, thereby reducing costs, and the peripheral circuits can also be reduced accordingly.

Figure 10:
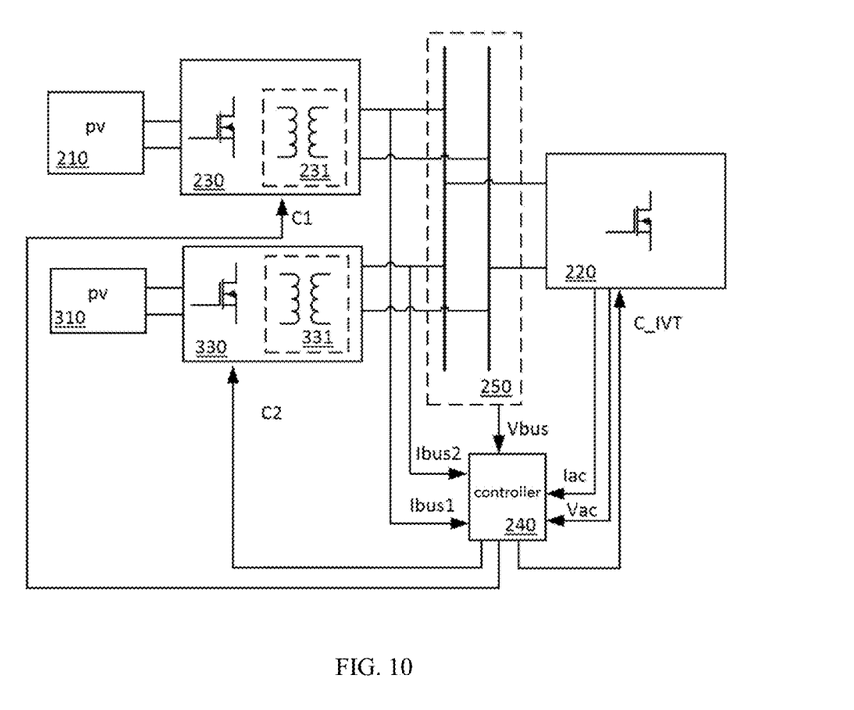
FIG. 10 is a schematic diagram of a power conversion device according to another embodiment of the present application.

Refer to FIG. 10 which is a schematic diagram of a power conversion device according to another embodiment of the application. On the basis of the power conversion device shown in FIG. 8, it further includes: a second boost isolation DC/DC converter 330 including a transformer 331. The input terminal of the second boost isolation DC/DC converter 330 is connected to a second photovoltaic component 310. The output terminal of the second boost isolation DC/DC converter 330 connected to the DC bus 250 to increase the power level of the power conversion device.

The controller 240 further receives the bus output current Ibus2 of the second boost isolation DC/DC converter 330, and outputs the switch control signal C2 for controlling the operation of the second boost isolation DC/DC converter according to the bus voltage Vbus and the bus output current Ibus2 of the second boost isolation DC/DC converter, to perform maximum power point tracking control of the second photovoltaic component 310.

The principle of realizing the maximum power point tracking of the second photovoltaic component 310 is the same as the above-mentioned principle of the maximum power point tracking of the first photovoltaic component 210, and will not be described again here.

Figure 11:
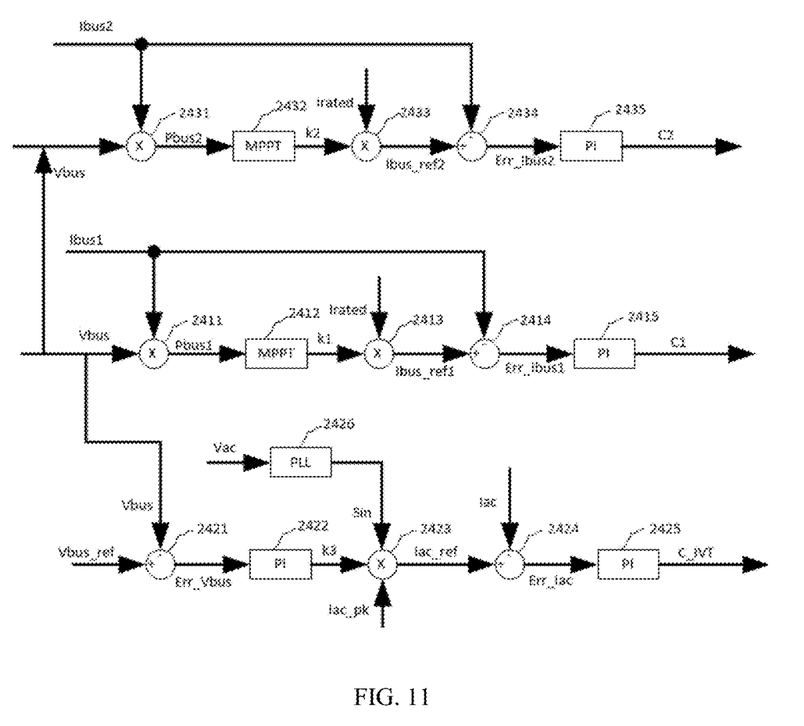
FIG. 11 is a schematic diagram of a controller applied in the power conversion device shown in FIG. 10.

For details, please refer to FIG. 11, which shows a schematic diagram of the controller applied in the power conversion device shown in FIG. 10. On the basis of the controller shown in FIG. 9, it adds a control loop to maximize the bus output current Ibus2 of the second boost isolation DC/DC converter 330. Specifically, it includes a multiplication module 2431, an MPPT module 2432, a multiplication module 2433, a subtraction module 2434 and an operation module 2435, whose functions are respectively the same as the first multiplication module 2411, the maximum power point tracking control module (MPPT) 2412, the second multiplication module 2413, the first subtraction module 2414 and the first operation module 2415 and will not be described again here.

In specific implementation, both the first photovoltaic component 210 and the second photovoltaic component 310 can be composed of one photovoltaic cell group, or multiple photovoltaic cell groups connected in series and parallel. Of course, one of them can be composed of one photovoltaic cell group, and the other can be composed of multiple photovoltaic cell groups connected in series and parallel. "Connect in series and parallel" herein includes series connection, parallel connection, series connection followed by parallel connection, and parallel connection followed by series connection. Regardless of the number of photovoltaic components in the first photovoltaic component 210 and the second photovoltaic component 310, the voltage of the first photovoltaic component 210 and the second photovoltaic component 310 is both low, and a boost isolation DC/DC converter is required to raise it to a higher voltage, and then used for the conversion of the rear-stage.

In the system shown in FIG. 10, there are two boost isolation DC/DC converters connected to the DC bus. However, in actual applications, according to the power level requirements, the number of the boost isolation DC/DC converters connected to the DC bus can be set. The corresponding controller also needs a corresponding number of loops to control the operation of the boost isolation DC/DC converter in order to track the maximum power point of the photovoltaic components connected to each boost isolation DC/DC converter.

For a multi-channel boost isolation DC/DC converter system, each channel only needs to sample the bus output current at its output terminal through a non-isolation sampling circuit. Compared with the existing technology that uses multiple isolated sampling circuits to sample the voltage of the photovoltaic component, multiple isolated sampling circuits are saved, so the cost and size of the power conversion system can be greatly reduced.

In the above-mentioned power conversion system, the rear-stage circuits are all inverters, so that their outputs can be connected to the grid or supply power to AC loads. In practical applications, the rear-stage circuit can also be a DC/DC conversion circuit to convert the DC power at the bus voltage into a DC power suitable for powering the DC load. This application does not limit the specific type of the rear-stage circuit.

In an embodiment of the present application, a maximum power point tracking control method of photovoltaic components is also provided, which is applied in a photovoltaic power generation system. Please refer to the power conversion device as shown in FIG. 5, the method includes:
detecting, by a voltage detection circuit, a bus voltage Vbus of a DC bus connected to an output terminal of a first boost isolation DC/DC converter 230;
  detecting, by a current detection circuit, a bus output current Ibus1 at the output terminal of the first boost isolation DC/DC converter 230;
  performing, by a controller 240, maximum power point tracking control of a first photovoltaic component 210 based on the bus voltage Vbus and the bus output current Ibus1 of the first boost isolation DC/DC converter, wherein an input terminal of the first boost isolation DC/DC converter 230 is connected to the first photovoltaic component 210.

As above, the sampling circuit for the signal required to track the maximum power point of the PV component is moved to the secondary side of the transformer. A sampling resistor with a larger resistance value can be used to improve the sampling accuracy and reduce the loss. Therefore, the method provided by this application have the advantages of high current sampling accuracy and low loss, and the design difficulty is greatly reduced. Moreover, the non-isolated sampling method using sampling resistors also has the smallest sampling delay, and the real-time control is better.

In one embodiment, the controller 240 controls to maximize the bus output current Ibus1 of the first boost isolation DC/DC converter 230 according to the bus voltage Vbus and the bus output current Ibus1 of the first boost isolation DC/DC converter, to achieve maximum power point tracking control of the first photovoltaic component 210. Refer to FIG. 6 and its description. The bus voltage Vbus is a substantially constant voltage value, so the output power Pout of the boost isolation DC/DC converter increases with the increase of the bus output current Ibus of the boost isolation DC/DC converter. As long as the boost isolation DC/DC converter is controlled to maximize the bus output current Ibus of the boost-isolated DC/DC converter, the output power Pout of the boost-isolated DC/DC converter can be maximized, thereby realizing the maximum power point tracking of the first photovoltaic component 210.

In one embodiment, refer to FIG. 7 and its description, the controller 240 performs the following steps:
  multiplying the bus voltage Vbus and the bus output current Ibus1 of the first boost isolation DC/DC converter to obtain a current output power Pbus1 of the first boost isolation DC/DC converter;
  obtaining a rated current variation coefficient k1 of the first boost isolation DC/DC converter based on a difference between the current output power Pbus1 of the first boost isolation DC/DC converter and an output power at a previous moment;
  multiplying the rated current variation coefficient k1 of the first boost isolation DC/DC converter and a rated current Irated of the first boost isolation DC/DC converter to obtain a bus output current reference value Ibus_ref1 of the first boost isolation DC/DC converter;
  performing a subtraction operation on the bus output current reference value Ibus_ref1 of the first boost isolation DC/DC converter and the bus output current Ibus1 of the first boost isolation DC/DC converter to obtain a bus output current difference Err_Ibus1 of the first boost isolation DC/DC converter; and
  outputting the switch control signal C1 for controlling the first boost isolation DC/DC converter based on the bus output current difference Err_Ibus1 of the first boost isolation DC/DC converter, to track the maximum power point of the first photovoltaic component 210.

As such, the loop used for maximum power point tracking control is a current loop that controls the bus output current Ibus. By calculating the output power of the first boost isolation DC/DC converter 230, disturbing the bus output current Ibus1 of the first boost isolation DC/DC converter 230, the bus output current Ibus1 of the first boost isolation DC/DC converter 230 is maximized to track the maximum output power of the first boost isolation DC/DC converter 230, thus achieving tracking the maximum power point of the photovoltaic component.

In one specific embodiment, please refer to the power conversion device as shown FIG. 8. The method further includes:

- detecting, by an alternating voltage detection circuit, an alternating voltage Vac at an AC output side of an inverter 220; and
- detecting, by an alternating current detection circuit, an alternating current Iac at the AC output side of the inverter, wherein a DC terminal of the inverter 220 is connected to the DC bus 250, and wherein the controller 240 further outputs a switch control signal C_IVT for controlling operation of the inverter based on the bus voltage Vbus, the alternating current Iac, and the alternating voltage Vac.

As such, the controller 240 further receives the alternating current Iac and the alternating voltage Vac output from the inverter 220, and outputs the switch control signal C_IVT that controls the operation of the inverter 220 according to the bus voltage Vbus, the alternating current Iac and the alternating voltage Vac, so as to realize the conversion of DC power into AC power and stabilize the bus voltage Vbus. Because the bus voltage Vbus is stabilized by the rear-stage inverter, the bus output current Ibus1 of the first boost isolation DC/DC converter 230 can be controller to maximize, thereby realizing the maximum output power of the first boost isolation DC/DC conversion, and the tracking of the maximum power point of the photovoltaic component, and outputting AC power suitable for grid-connection or AC loads.

In one specific embodiment, refer to FIG. 9 and its description, the controller further performs:

- performing a subtraction operation on a bus voltage reference value Vbus_ref and the bus voltage Vbus to obtain a bus voltage difference Err_Vbus;
- obtaining an alternating current variation coefficient k3 based on the bus voltage difference Err_Vbus;
- outputting a phase-locked sine wave Sin based on the alternating voltage Vac;
- multiplying the phase-locked sine wave Sin, the alternating current variation coefficient k3 and a peak value Iac_pk of the alternating current to obtain an alternating current reference value Iac_ref;
- performing a subtraction operation on the alternating current reference value Iac_ref and the alternating current Iac to obtain an alternating current difference Err_Iac; and
- outputting the switch control signal C_IVT for controlling the inverter based on the alternating current difference Err_Iac.

That is to say, the control of the inverter in the rear-stage includes two loops: one is the voltage loop of the bus voltage Vbus, and the output of the loop is the alternating current variation coefficient k3. The alternating current variation coefficient k3 is multiplied by the phase-locked sine wave Sin, and then multiplied by the alternating current peak value Iac_pk to obtain the alternating current reference value Iac_ref. Then the difference between the sampled alternating current Iac and the alternating current reference value Iac_ref is used to PI operation to obtain the switch control signal C_IVT for controlling the rear-stage inverter. For two loops of the rear-stage inverter, one is used to stabilize the bus voltage Vbus and the other to output sinusoidal current.

In one specific example, refer to the power conversion system as shown in FIG. 10. The method further includes:

detecting, by a second current detection circuit, a bus output current Ibus2 of a second boost isolation DC/DC converter 330, wherein the controller 240 further performs the maximum power point tracking control of the second photovoltaic component 310 based on the bus voltage Vbus and the bus output current Ibus2 of the second boost isolation DC/DC converter, and wherein an input terminal of the second boost isolation DC/DC converter 330 is connected to the second photovoltaic component 310.

Furthermore, the controller 240 maximizes the bus output current Ibus2 of the second boost isolation DC/DC converter 330 based on the bus voltage Vbus and the bus output current Ibus2 of the second boost isolation DC/DC converter 330, to achieve the maximum power point tracking control of the second photovoltaic component 310.

In a specific implementation, the switch control signal C1, switch control signal C2 and switch control signal C_IVT above mentioned can be a duty ratio control signal PWM or a frequency control signal PFM.

The current sampling circuit and voltage sampling circuit in this application are both non-isolation sampling circuits, such as a resistor plus operational amplifier sampling circuit. However, this application does not limit the specific structure of the non-isolation sampling circuit. As long as the non-isolation circuit that can realize the sampling of current or voltage is applicable to this application.

Finally, it should be noted that the above embodiments are only used to illustrate the technical solution of the present disclosure rather than limitation thereof. Although the present disclosure has been described in detail with reference to the foregoing embodiments, it will be appreciated by those of ordinary skill in the art that the technical solutions described in the foregoing embodiments can still be modified or part or all of the technical features thereof can be equivalently replaced; and these modifications or replacements do not make the essence of the corresponding technical solution deviate from the scope of the technical solution of each embodiment of the present disclosure.

What is claimed is:

1. A power conversion device for a photovoltaic system, comprising:
    a boost isolation DC/DC converter including a transformer, wherein an input terminal of the boost isolation DC/DC converter is connected to a photovoltaic component, and an output terminal of the boost isolation DC/DC converter is connected to a DC bus; and
    a controller configured to receive a bus voltage of the DC bus and a bus output current output by the boost isolation DC/DC converter, and output, based on the bus voltage and the bus output current output by the boost isolation DC/DC converter, a switch control signal that controls the boost isolation DC/DC converter to perform maximum power point tracking control of the photovoltaic component, the controller comprising:
    a first multiplication module multiplying the bus voltage and the bus output current of the boost isolation DC/DC converter to obtain a current output power of the boost isolation DC/DC converter;
    a maximum power point tracking control module obtaining a rated current variation coefficient of the boost isolation DC/DC converter based on a difference between the current output power of the boost isolation DC/DC converter and an output power of the boost isolation DC/DC converter at a previous moment;
    a second multiplication module multiplying the rated current variation coefficient of the boost isolation DC/DC converter and a rated current of the boost isolation DC/DC converter to obtain a bus output current reference value of the boost isolation DC/DC converter;

a first subtraction module performing a subtraction operation on the bus output current reference value of the boost isolation DC/DC converter and the bus output current of the boost isolation DC/DC converter to obtain a bus output current difference of the boost isolation DC/DC converter; and a first operation unit outputting the switch control signal for controlling the boost isolation DC/DC converter based on the bus output current difference of the boost isolation DC/DC converter.

2. The power conversion device according to claim 1, wherein:

the controller and a secondary winding of the transformer have a common ground.

3. The power conversion device according to claim 1, wherein:

the controller is further configured to control, by use of the switch control signal, to maximize the bus output current output by the boost isolation DC/DC converter.

4. The power conversion device according to claim 1, wherein:

the photovoltaic component comprises one photovoltaic cell group, or multiple photovoltaic cell groups connected in series and parallel.

5. The power conversion device according to claim 1, further comprising:

a voltage detection circuit, provided at the secondary side of the transformer and configured to sample the bus voltage of the DC bus; and a current detection circuit, provided at the secondary side of the transformer and configured to sample the bus output current that is output by the boost isolation DC/DC converter.

6. The power conversion device according to claim 5, wherein:

the voltage detection circuit and the current detection circuit are non-isolated detection circuits.

7. The power conversion device according to claim 1, wherein:

the bus voltage of the DC bus has a substantially constant voltage value.

8. The power conversion device according to claim 1, wherein:

the bus output current that is output by the boost isolation DC/DC converter is no more than 1.5 A.

9. The power conversion device according to claim 1, wherein:

a loop used for the maximum power point tracking control is configured as a current loop to control the bus output current.

10. The power conversion device according to claim 9, wherein:

the current loop is configured to calculate an output power of the boost isolation DC/DC converter and disturb the bus output current of the boost isolation DC/DC converter, to maximize the bus output current of the boost isolation DC/DC converter to track a maximum output power of the boost isolation DC/DC converter.

11. The power conversion device according to claim 1, wherein the boost isolation DC/DC converter includes: a primary switch unit, a transformer and a secondary switch unit, the primary switch unit is connected between the photovoltaic component and a primary winding of the transformer, and the secondary switch unit is connected between a secondary winding of the transformer and the DC bus.

12. A maximum power point tracking control method for a photovoltaic component, comprising:

detecting, with a voltage detection circuit of a power conversion device, a bus voltage of a DC bus connected to an output terminal of a boost isolation DC/DC converter;

detecting, with a current detection circuit of the power conversion device, a bus output current at the output terminal of the boost isolation DC/DC converter; and performing, with a controller of the power conversion device, maximum power point tracking control of a photovoltaic component based on the bus voltage and the bus output current of the boost isolation DC/DC converter, wherein an input terminal of the boost isolation DC/DC converter is connected to the photovoltaic component; and wherein the method further comprises:

multiplying, with the controller, the bus voltage and the bus output current of the boost isolation DC/DC converter to obtain a current output power of the boost isolation DC/DC converter;

obtaining, with the controller, a rated current variation coefficient of the boost isolation DC/DC converter based on a difference between the current output power of the boost isolation DC/DC converter and an output power at a previous moment;

multiplying, with the controller, the rated current variation coefficient of the boost isolation DC/DC converter and a rated current of the boost isolation DC/DC converter to obtain a bus output current reference value of the boost isolation DC/DC converter;

performing, with the controller, a subtraction operation on the bus output current reference value of the boost isolation DC/DC converter and the bus output current of the boost isolation DC/DC converter to obtain a bus output current difference of the boost isolation DC/DC converter; and outputting, with the controller based on the bus output current difference of the boost isolation DC/DC converter, the switch control signal for controlling the boost isolation DC/DC converter, to track a maximum power point of the photovoltaic component.

13. The maximum power point tracking control method according to claim 12, further comprising:

controlling, with the controller, to maximize the bus output current of the boost isolation DC/DC converter based on the bus voltage and the bus output current of the boost isolation DC/DC converter, to achieve the maximum power point tracking control of the photovoltaic component.

14. The maximum power point tracking control method according to claim 12, wherein:

the boost isolation DC/DC converter includes: a primary switch unit, a transformer and a secondary switch unit, the primary switch unit is connected between the photovoltaic component and a primary winding of the transformer, and the secondary switch unit is connected between a secondary winding of the transformer and the DC bus.

15. The maximum power point tracking control method according to claim 14, wherein:

the voltage detection circuit and the current detection circuit are configured at a secondary side of the transformer.

16. The maximum power point tracking control method according to claim 15, wherein:
    the voltage detection circuit and the current detection circuit are non-isolated detection circuits.

17. The maximum power point tracking control method according to claim 12, wherein:
    the bus output current that is output by the boost isolation DC/DC converter is no more than 1.SA.

18. The maximum power point tracking control method according to claim 12, wherein:
    the bus output current that is output by the first boost isolation DC/DC converter is no more than 1.5 A.

19. The maximum power point tracking control method according to claim 12, wherein:
    a loop used for the maximum power point tracking control is a current loop configured to control the bus output current.

20. The maximum power point tracking control method according to claim 19, wherein the current loop is configured to calculate an output power of the boost isolation DC/DC converter and disturb the bus output current of the boost isolation DC/DC converter, to maximize the bus output current of the boost isolation DC/DC converter to track a maximum output power of the boost isolation DC/DC converter.

\* \* \* \* \*

UNITED STATES PATENT AND TRADEMARK OFFICE
CERTIFICATE OF CORRECTION

| | | |
|---|---|---|
| PATENT NO. | : 12,149,087 B1 | Page 1 of 1 |
| APPLICATION NO. | : 18/657729 | |
| DATED | : November 19, 2024 | |
| INVENTOR(S) | : Chongfeng Zheng and Jian Peng | |

It is certified that error appears in the above-identified patent and that said Letters Patent is hereby corrected as shown below:

In the Claims

Column 19, Line 7, cancel the text beginning with "the bus" and ending with "more than 1.SA." in Line 8, and insert the following:
--the bus voltage of the DC bus has a substantially constant voltage value.--

Signed and Sealed this
Twenty-eighth Day of January, 2025

Coke Morgan Stewart
*Acting Director of the United States Patent and Trademark Office*